United States Patent
Baureis et al.

[11] Patent Number: 5,629,082
[45] Date of Patent: May 13, 1997

[54] MULTILAYER MATERIAL FOR SLIDING SURFACE BEARINGS

[75] Inventors: Hans-Paul Baureis, Horrenberg; Werner Schubert, Wiesloch; Manfred Müller, Untereisesheim, all of Germany

[73] Assignee: Kolbenschmidt Aktiengesellschaft, Neckarsulm, Germany

[21] Appl. No.: 259,703

[22] Filed: Jun. 14, 1994

[30] Foreign Application Priority Data

Jun. 16, 1993 [DE] Germany .................. 43 19 867.8

[51] Int. Cl.⁶ .................................................. B32B 5/22
[52] U.S. Cl. ........................ 428/306.6; 428/307.3; 428/328; 428/422; 428/463; 508/104
[58] Field of Search ..................... 428/306.6, 307.3, 428/312.8, 323, 328, 422, 463; 252/12, 12.2

[56] References Cited

U.S. PATENT DOCUMENTS

| | | | |
|---|---|---|---|
| 4,394,275 | 7/1983 | Bickle et al. | 252/12 |
| 4,812,367 | 3/1989 | Bickle | 428/332 |
| 4,847,135 | 7/1989 | Braus et al. | 428/138 |
| 5,024,881 | 6/1991 | Matucha et al. | 428/323 |
| 5,024,882 | 6/1991 | Matucha et al. | 428/323 |

FOREIGN PATENT DOCUMENTS

| | | |
|---|---|---|
| 0044577 | 1/1982 | European Pat. Off. . |
| 0430324 | 6/1991 | European Pat. Off. . |

*Primary Examiner*—Marion E. McCamish
*Assistant Examiner*—Blaine R. Copenheaver
*Attorney, Agent, or Firm*—Sprung Horn Kramer & Woods

[57] ABSTRACT

A multilayer material for sliding surface bearings comprises a metal backing layer, a sintered porous bearing layer of a bearing metal, and a low-friction layer consisting of a mixture of PTFE and 5 to 30% by volume metal filler, and fills also the pores of the bearing layer. To reduce the wear the mixture of PTFE and metal filler contains also 5 to 40% by volume PVDF.

4 Claims, 1 Drawing Sheet

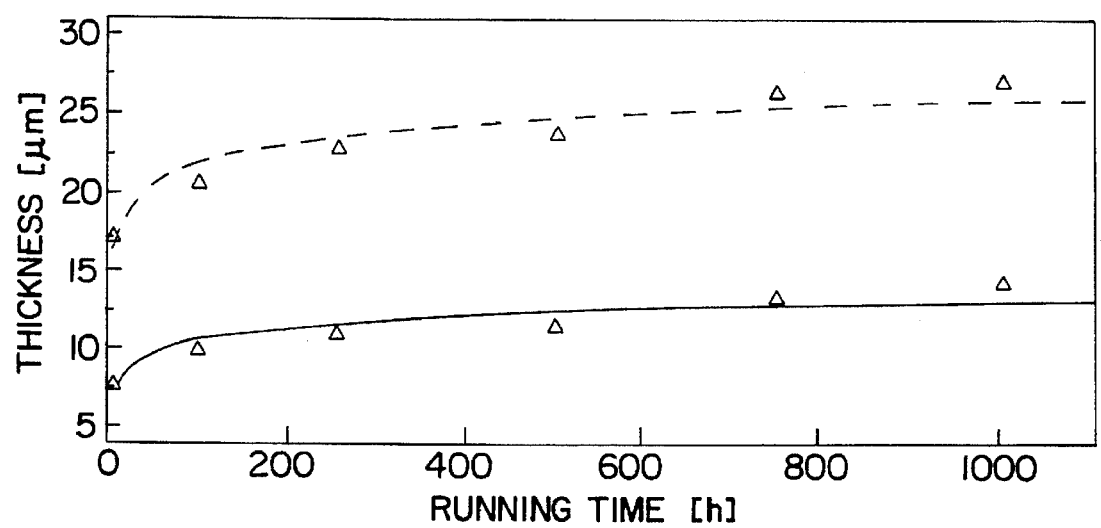

MULTILAYER MATERIAL FOR SLIDING SURFACE BEARINGS

DESCRIPTION

This invention relates to a multilayer material for sliding surface bearings, which comprises a metal backing layer, a porous bearing layer, which consists of a metal for sliding surface bearings and has been sinter-bonded to the backing layer, and a low-friction layer, which completely fills also the pores of the bearing layer and consists of a mixture of polytetrafluoroethylene (PTFE) and 5 to 30% by volume metal filler.

Sliding surface bearings made of massive plastics have a very low affinity to the surface with which they are in sliding contact and for this reason do not tend to seize and in comparison with metal sliding surface bearings impose much less stringent requirements as regards the supply of lubricant. On the other hand, such sliding surface bearings have only a limited field of application because they tend to exhibit a cold flow under load and have a high thermal expansion, a low thermal conductivity, and a comparatively low abrasion resistance.

Said disadvantages can be avoided by sliding surface bearings which comprise a backing layer of steel, a high-strength aluminum alloy or bronze, a porous bearing layer, which consists of bronze (tin bronze or tin-lead bronze) or an aluminum bearing alloy and which has been sinter-bonded to the backing layer, and a low-friction layer, which consists of a mixture of PTFE and 5 to 30% by volume lead or zinc sulfide and by which the void volume of the bearing layer is also entirely filled (Technisches Handbuch der Kolbenschmidt AG, No. 16, 1989). During the first few operating hours the low-friction layer is partly transferred to the surface with which the bearing is in sliding contact. This phenomenon results in a sliding surface which has a low coefficient of friction and a low wear. The bearing layer is a stable skeleton, which has a high carrying capacity and ensures an effective dissipation of heat. The mixture of PTFE and lead or zinc sulfide which is included in the bearing layer will emerge when it is heated by friction and will then act as a lubricant. Owing to the backing layer and the bearing layer the sliding surface bearing has a high compressive strength of about 320N/mm². Such sliding surface bearings are designed for an operation without a need for service and for additional lubricants and are highly insusceptible to an ingress of foreign particles and may be used at ambient temperatures from −200° to +280° C. A very favorable coefficient of sliding friction of 0.03 will be achieved under the highest permissible specific load p on the bearing of 250 to 140N/mm² and a low sliding velocity v of up to 0.001 m/s. The coefficient of sliding friction will rise to 0.15 to 0.25, at most, if the load p on the bearing is <1N/mm² and the highest permissible sliding velocity v=0.5 to 2 m/s. The wear and with it the life of the sliding surface bearing will be determined not only by the upper limit of the specific load on the bearing of 250N/mm² but also by the product of the specific load p on the bearings and the sliding velocity v of the surface with which the bearing is in sliding contact. For a continuous operation of the sliding surface bearing a pv value of 1.8N/mm²×m/s is permissible for a long-term operation of the sliding surface bearing and that value may amount to 3.6N/mm²×m/s for a short time. The sliding surface bearing is of universal utility in most industrial fields.

It is an object of the present invention to provide for sliding surface bearings a multilayer material which is of the kind described first hereinbefore and in which the depth of wear, which is proportional to the pv value, is decreased whereas the favorable coefficient of friction is not adversely affected.

That object is accomplished in that the mixture of PTFE and metal filler contains also 5 to 40% by volume polyvinylidene fluoride (PVDF).

As a result of that measure the permissible sliding velocity v is increased to 2.5 to 3 m/s so that the depth of wear after an operation of the sliding surface bearing for 600 hours can be decreased from up to 40 micrometers to a depth which is distinctly below 15 micrometers.

According to a further feature of the invention the thickness of the low-friction layer over the peaks of the bearing layer may be increased to from >30 micrometers up to as much as 80 micrometers so that the bearing bore of roll-formed bushings made of the multilayer material for sliding surface bearings in accordance with the invention can conveniently be machined.

If the multilayer material for sliding surface bearings is used for sliding surface bearings which are used for relatively higher sliding velocities and under relatively lower specific loads on the bearing, it will be desirable to form the sliding surface of the low-friction layer with lubricant pockets for receiving an initial lubricant.

The invention will be further described with reference to the accompanying drawing which is a plot of thickness against running time for a material in accordance with the present invention alongside a material outside the present invention.

In making such plots, five rolled bushing made from the multilayer material for sliding surface bearings according to the invention have been tested in comparison with fine multilayer bushings made from the multilayer material for sliding surface bearings of the prior art. Each bushing was 20 mm and 23 mm in inside and outside diameter, respectively, and has a length of 20 mm. The roll-formed bushings consisted of a backing layer of steel in a thickness of 1.1 mm and a porous lead-tin bronze layer, which had a thickness of 0.3 mm and had been sinter-bonded to the backing layer and the void volume of which was entirely filled by a mixture of 70% by volume polytetrafluoroethylene (PTFE), 10% by volume polyvinylidene fluoride (PVDF) and 20% lead. The same mixture constituted a low-friction layer, which was provided in a thickness of 30 micrometers over the peaks of the lead-tin bronze layer. From that structure the roll-formed bushings made from the known multilayer material for sliding surface bearings differed only in that the pores of the tin-bronze layer and the low-friction layer consisted of 80% by volume PTFE and 20% by volume lead.

The roll-formed bushings were subjected on a rotary test stand to a wear test under a specific bearing load p of 0.6N/mm² and at a sliding velocity v (of the shaft) of 2.3 m/s so that the pv value was 1.38N/mm²×m/s. The curves shown on the drawing represent the wear behavior of the roll-formed bushings in dependence on the running time. Each curve represents average values obtained in wear tests of the five bushings of each set. From said curves it is apparent that the wear of the roll-formed bushings made from the multilayer material for sliding surface bearings in accordance with the invention (solid lines) was about 50% lower than the wear of the roll-formed bushings made from the multilayer sliding surface material for sliding surface bearings of the prior art (dash line) after a running-in time of up to about 600 hours and after the full operating life of the bushings.

We claim:

1. A multilayer material for sliding surface bearings, which comprises a metal backing layer; a porous bearing layer, which consists of a metal for sliding surface bearings and has been sinter-bonded to the backing layer; and a low-friction layer, which completely also fills the pores of the bearing layer and consists essentially of a mixture of at least about 70% by volume of polytetrafluoroethylene (PTFE), about 5 to 25% by volume metal filler, and about 5 to 25% by volume polyvinylidene fluoride (PVDF).

2. A multilayer material for sliding surface bearings according to claim 1, characterized in that the low-friction layer has a thickness from approximately 30 micrometers up to 80 micrometers.

3. A multilayer material for sliding surface bearings according to claim 1, characterized in that the sliding surface of the low-friction layer is formed with lubricant pockets.

4. A sliding surface bearing made of the multilayer material according to claim 1.

* * * * *